J. R. ROYER.
ANIMAL FEEDING DEVICE.
APPLICATION FILED FEB. 17, 1920.

1,350,523.

Patented Aug. 24, 1920.

Inventor,
Jesse R. Royer, by
G. C. Kennedy,
Attorney.

UNITED STATES PATENT OFFICE.

JESSE R. ROYER, OF JANESVILLE, IOWA.

ANIMAL-FEEDING DEVICE.

1,350,523.  Specification of Letters Patent.  Patented Aug. 24, 1920.

Application filed February 17, 1920. Serial No. 359,352.

*To all whom it may concern:*

Be it known that I, JESSE R. ROYER, a citizen of the United States of America, and a resident of Janesville, Bremer county, Iowa, have invented certain new and useful Improvements in Animal-Feeding Devices, of which the following is a specification.

My invention relates to improvements in animal feeding devices, particularly to such as provide a container or hopper positioned to deliver grain or prepared feed into a feeding trough or vessel, and the object of my improvement is to so construct and mount the hopper relative to the receiving vessel as to prevent any interference with the delivery of the feed from the one into the other.

Figure 1:
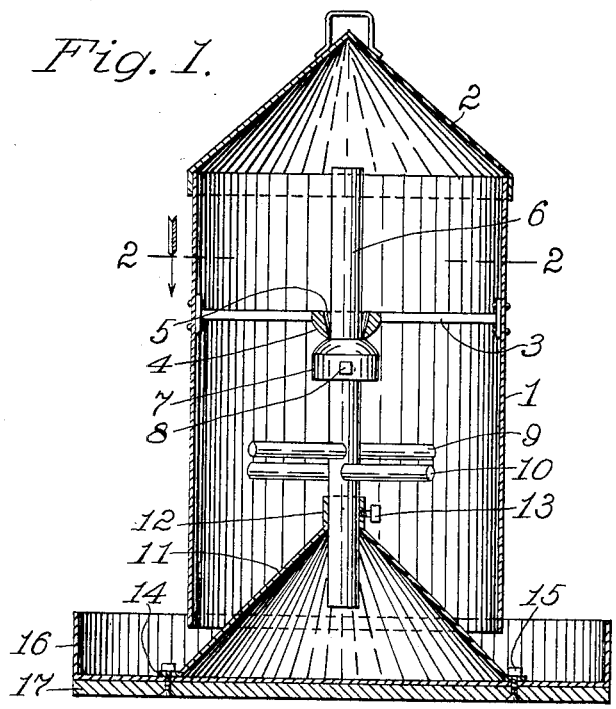
Figure 2:
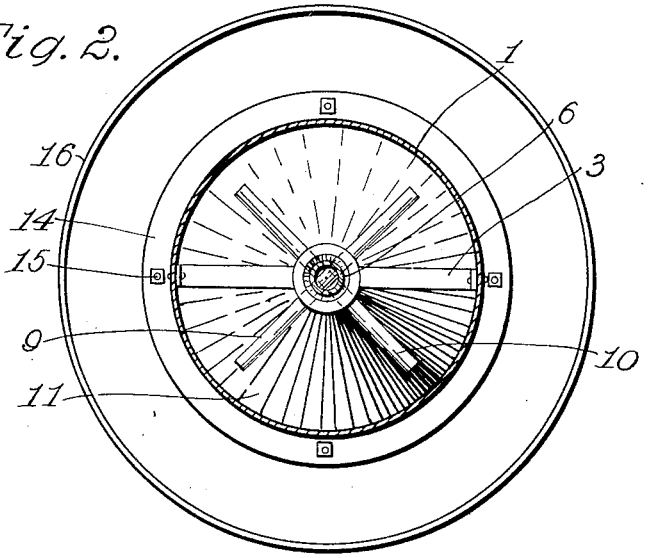

This object I have accomplished by the means which are hereinafter described and claimed, and which are illustrated in the accompanying drawings, in which Figure 1 is a central vertical section of my improved animal feeding device, and Fig. 2 is a horizontal section thereof taken on the broken line 2—2 of Fig. 1, looking downwardly.

Similar numerals of reference denote corresponding parts throughout the several views.

The numeral 16 denotes a circular feeding vessel with raised rim, mounted upon basal planks 17, a hollow cone 11 being positioned concentrically within said vessel and having a marginal rim 14 secured to the bottom of the vessel and to the planks 17 by bolt and nut fastenings 15. Said cone is apically terminated by a hollow cylindrical part 12, within which is slidably mounted a vertical cylindrical standard 6 and secured adjustably thereto by a set-screw 13.

The numerals 9 and 10 denote like horizontally disposed rods which are mounted medially and at right angles to each other in transverse openings in the standard 6 immediately above the cylinder 12. A short distance above the uppermost rod 9, a sleeve-like body 7, which may be a hollow casting of considerable diameter, is secured adjustably upon said standard 6 by a set-screw 8. Another hollow casting 4 is mounted loosely upon said standard, its lower part being convex at 4 and supported upon a like convex top of the sleeve 7. The hollow 5 of the body 4 is coned downwardly about said standard to permit said body to freely oscillate in any direction upon the convex upper surface of the sleeve 7. The hollow body 4 has integral oppositely extending horizontal arms 3 which at their extremities contact with and are secured to the inner wall of a vertically disposed hollow open-ended container or hopper 1, whose upper end is closed by a conical removable cover 2. The open lower end of said hopper surrounds the cone 11 concentrically and is spaced therefrom a requisite distance as may be necessary to properly deliver therebetween grain or ground feed of different consistencies, the width of the interspace being adjusted by the adjustment of the sleeve 7 vertically upon said standard 6.

When ground feed or small grain is placed in the hopper 1, it might, if the hopper were supported rigidly on the standard 6, become arched over the annular interspace of the cone 11 and the lower end of the hopper, thus interfering with and obstructing free delivery of the feed into the vessel 16. In my improved device, the hopper 1 is mounted on said standard to freely rotate and oscillate relative thereto. Stock, in feeding from the vessel 16 will push upon the lower part of the hopper 1, thus oscillating it which breaks up any obstruction and permits free delivery from the hopper. The arms 9 and 10, being of less length than the interior diameter of the hopper, coact in the above operation in stirring the contents, or rather, providing spaced breakers for concretions of the feed when the hopper is oscillated to and from them.

Slight variations in the construction of my device are within the scope and principles of my invention.

Having described my invention, what I claim as new, and desire to secure by Letters Patent, is:

1. In an animal feeding device, a receiving vessel, a standard erected therein, a sleeve mounted on said standard, a hollow body positioned around said standard having a convex base supported on said sleeve for rotatory and oscillatory movements, and an open-ended hopper supported on said hollow body, with its open lower end spaced from said receiving vessel.

2. In an animal feeding device, a receiving vessel, a hollow cone mounted in said vessel, a standard mounted centrally adjustably in said cone and having a plurality of radial arms above the cone, a sleeve mounted on the standard above said arms, said sleeve having a convex top, a hollow body positioned around the standard having a convex base supported on the convex top of said sleeve for rotatory and oscillatory movements, said body having arms, and a hopper fixed on said arms concentric with the standard, having an open lower end spaced from said vessel, said cone, and the outer ends of the arms on said standard.

Signed at Waterloo, Iowa, this 17th day of January, 1920.

JESSE R. ROYER.